April 26, 1927.
H. ROZIER
1,626,559
UNIVERSAL WOODWORKING MACHINE FOR CARPENTERS, JOINERS, AND CABINET MAKERS
Filed Nov. 2, 1925    5 Sheets-Sheet 3
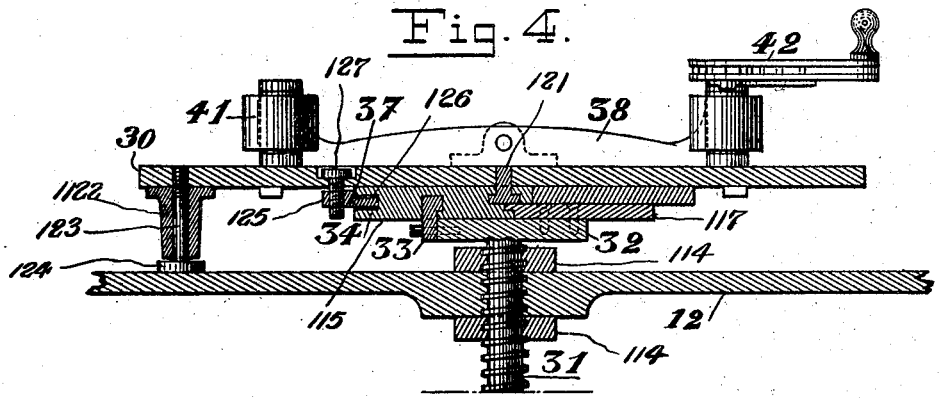
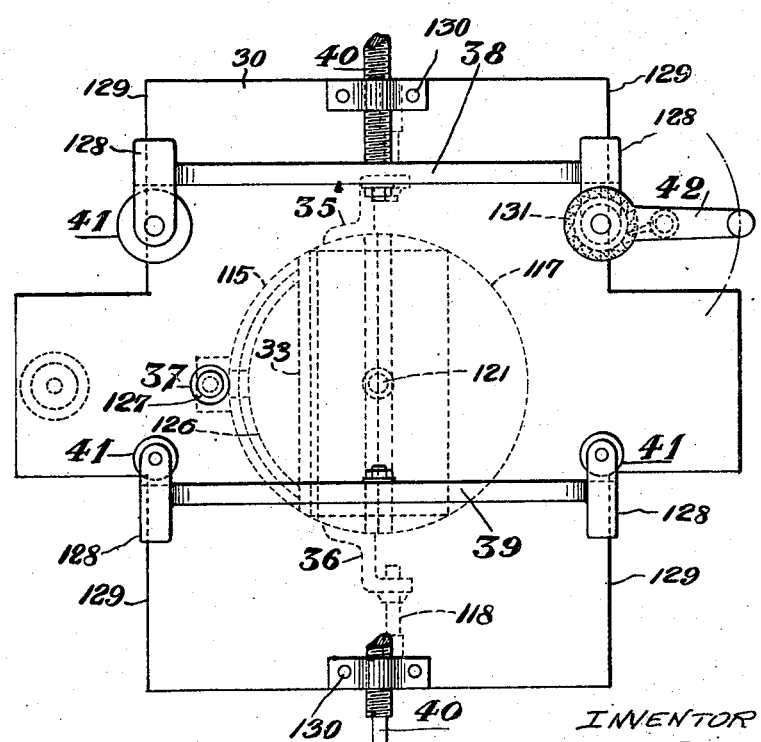
INVENTOR:
Honoré Rozier

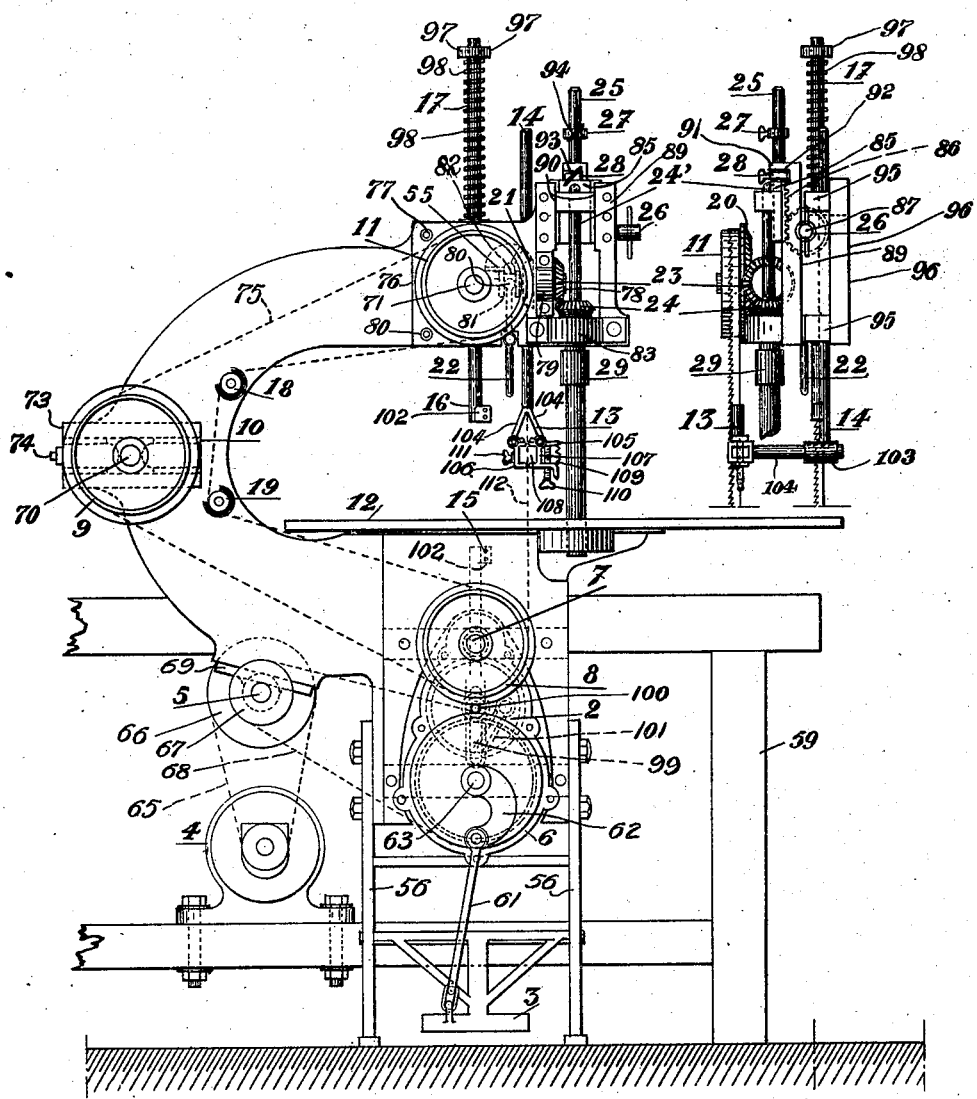

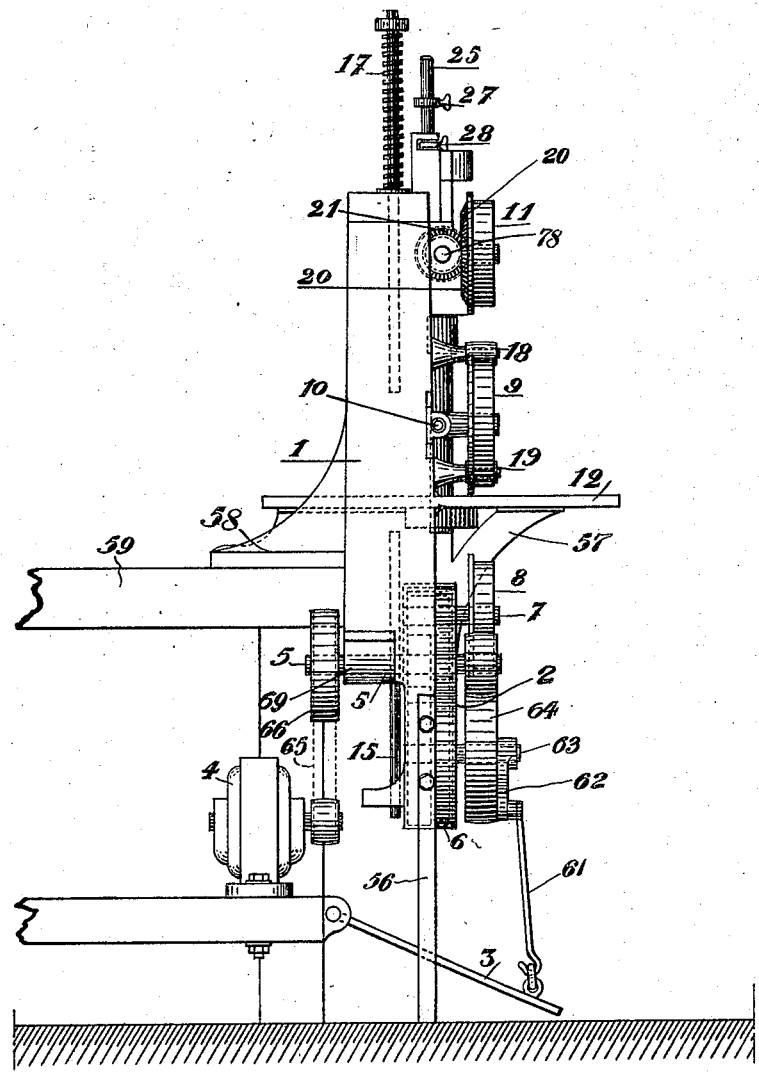

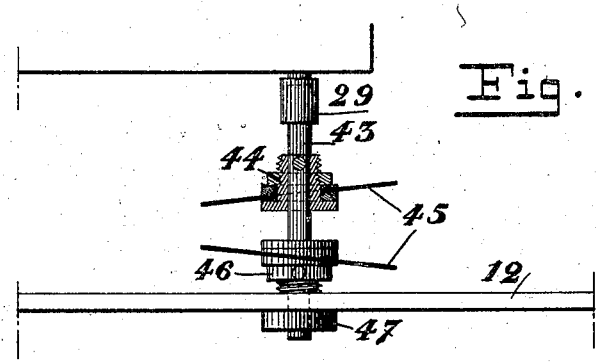
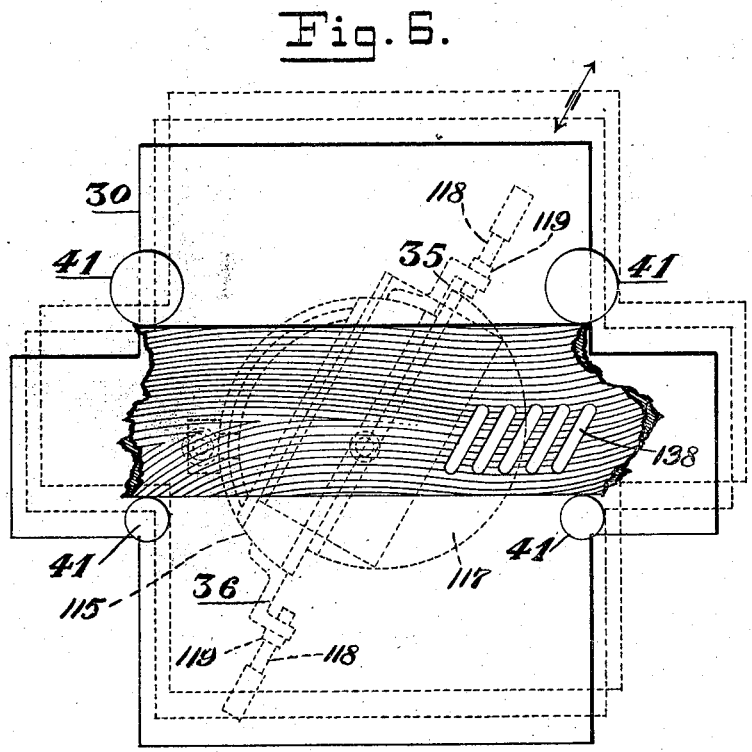

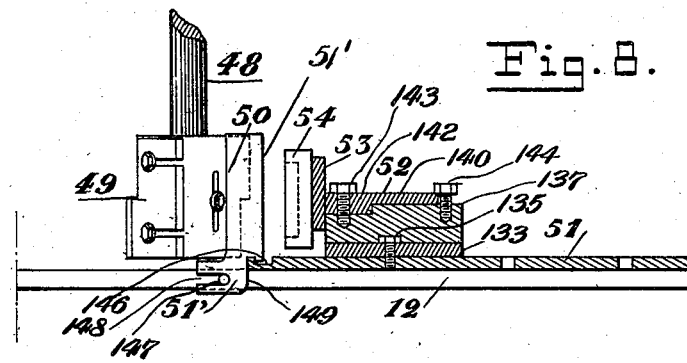
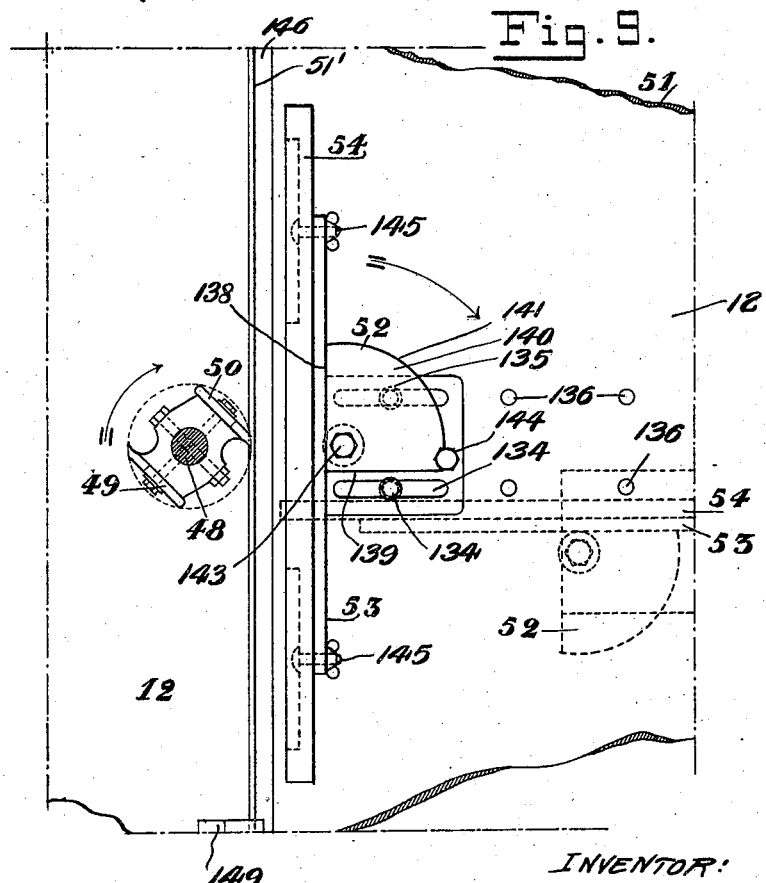

Patented Apr. 26, 1927.

1,626,559

UNITED STATES PATENT OFFICE.

HONORÉ ROZIER, OF MARSEILLE, FRANCE.

UNIVERSAL WOODWORKING MACHINE FOR CARPENTERS, JOINERS, AND CABINET-MAKERS.

Application filed November 2, 1925, Serial No. 66,352, and in France November 10, 1924.

The invention, hereinafter described, relates to woodworking machines of that type whereby a multiplicity of operations can be performed.

The object of my invention is to provide a machine of the type above referred to comprising parts which, combined in the manner hereinafter described constitute an extremely efficacious machine tool of strong, durable, and comparatively inexpensive construction.

The invention consists in the particular combinations and arrangements of parts as hereinafter described and defined in the claiming clauses hereto appended.

Reference being had to the drawings herewith:—

Figure 1 is a view of one side of the machine as it appears secured to a work-bench; Fig. 2 is a view of a side which is at right angles to the side shown in Fig. 1 and Fig. 3 is a view of a side which is the opposite to that shown in Fig. 2, of the upper part of the machine; Fig. 4 is a view of an adjustable fitting for holding wood during the operation of mortising, applicable to the table of the machine; Fig. 5 a plan of the fitting shown in Fig. 4; Fig. 6 a plan illustrating adjustments and operation of the fitting; Fig. 7 is a view of a tenon-saw holding device; Fig. 8 a planing tool and adjustable timber guides; Fig. 9 is a plan of Fig. 8.

A suitably shaped frame 1 is bolted to supports 56 at a suitable height to permit a lug 58 to be secured, by bolts or screws, to the upper surface of a work-bench 59. The frame 1 having a support 57 to support a work-table 12.

A pedal 3, hinged in the support 56, has a connecting rod 61 connecting it with a crank arm 62 on a shaft 63 supporting a fly-wheel pulley 64 and forming part of a train of gearing 2, having a casing 6 bolted to the frame 1; the gear being also capable of operation by means of an electric motor 4, secured to the work-bench, or otherwise supported, and adapted to impart motion to a pulley 66, through a belt 65; the pulley being supported by a shaft 5 which also supports a pulley 67 on which runs a belt 68 to impart motion to the wheel 64, or to enable the wheel 64 to impart motion to the wheel 67. The shaft 5 is supported in a bracket 69 secured on the frame 1.

The gearing drives, at increased speed, a shaft 7 supporting a flange-pulley 8; the annular surface of which is encompassed by a rubber band. Similar wheels 9, and 11 are supported by shafts 70, 71. The shaft 70 is a stub-shaft on a slide 10 capable of being adjusted longitudinally in a guide 73 by means of a screw 74; the mechanism constituting a device for adjusting the tension of an endless belt 75, which runs over the pulleys 8, 9, 11 and two pulleys 18, 19; thereby enabling the band to clear the table 12. The shaft 71 is journalled in a frame 76, bolted at 77 to the frame 1.

A bevel-wheel 20, on the shaft 71 meshes with a bevel-pinion 21, on a shaft 78, journalled in a bearing 79, and supporting a second bevel-pinion 23. The pinion 21 can be slid upon its shaft by a hand-lever 22 of which one end is bifurcated and has its extremities 80 rounded and engaging an annular groove in the boss 82 of the pinion. The pinion 21 can therefore be put into and out of mesh with the bevel-wheel 20. A shaft 24', slidably journalled in a bearing 83 has secured thereto a chuck 29, and has its upper end journalled in a projection 84 of a slide 85. This slide has secured to it a toothed rack 86 meshing with a toothed wheel 26 on a shaft 87 having a handle 88 and journalled in a part 89 of the frame 76. The slide 85 is capable of being moved vertically between guides 90, by manipulatively turning the handle 88, to raise or lower the shaft 24'. A shaft 25, projecting from the upper part of the slide 85 passes through an overhanging lug 91 on the part 89 of the frame 76, which lug has a slot 92 to receive a collar 28 fitted with a set-screw 93 and fitted loosely on the shaft 24'; there being a second collar 27 and set-screw 94 on the shaft. By means of the collar 28 and set-screw 93, the shafts 25 and 24' can be securely held at any desired height and, when the set-screw 93 is loosened, the downward movement of the shafts can be limited by adjustment of the collar 27 on its shaft; the upward movement being limited by the chuck 29. On the shaft 24' is a pinion 24 meshing with the pinion 23, and made capable of sliding but incapable of rotating on the shaft 24' by means of a feather and slot.

A shaft 17, vertically disposed and slidable in lugs 95 in an arm 96 being part of the frame 76, has a collar 97 between which and the frame 96 is a spring 98. The shaft 17 is in alignment with a shaft 15 which can slide vertically through the upper part of the casing 6 and, having a slot 99, it can also slide over the gear-shaft 100. Up and down movement is imparted to the shaft by a connecting rod 101 on one of the gear wheels. Each of the shafts has means 102, for attaching a jig-saw thereto.

A shaft 14 is vertically and slidably disposed in the head 76 and can be set at any desired height by means of a set-screw. At the lower end of the shaft 14 is a horizontally disposed sleeve 103 in which is held an arm 104, secured by a set-screw or the like, and having at one end, a saw-greasing device 13 of any suitable type. In the present instance, a device is shown, which comprises two fixed arms 104 of which one has a projecting lug 105. An arm 106 riveted rigidly to one arm 104, and an arm 107 loosely pivoted to the other arm 104, enclose a space 108. A spring 109, between the lug 105 and a lug 60 tends to draw the lugs together and separate the arm 107 from the arm 106. This separation can, however, be regulated by a set-screw 110; there being also a set-screw 111 in the arm 106. A band-saw 112 passing between the arms 104 and 106, 107 can be greased by the insertion of tablets of suitable grease into the space 108 at each side of the saw; the screws 110 and 111, enabling them to be pressed against the saw; the screw 110 pressing the arm 106 inwards, and the screw 111 bearing against the tablet which should preferably, be reinforced by the metal backing contiguous to the screw.

A blower 55, operated by electricity or by any other means, serves to keep the table 12 clear of wood dust.

The operation of the machine, heretofore described, is as follows:—

The gear 2 is driven, either by the pedal 3, connecting-rod 61 and crank 62 or, by the motor 4, belt 65, pulleys 66, 67, belt 68 and wheel 64. The pulley 11 is driven by the band 75 passing over pulleys 8, 9, 18, 19, and the shaft 71 communicates rapid motion to the bevel wheel 20, and rotation, at greater speed, to the bevel pinions 21, 23, 24 and spindle 24', thereby revolving the chuck and any bit or tool inserted therein as, for instance a drill, the shank of a buffing or polishing wheel, the shank 48 (Fig. 8) of a planing bit, having cutters 49, 50, a spindle 43 (Figs. 1 and 7) for holding any tool which can be conveniently applied thereto such as tenon-saws 45, held between clamps 44, 46; these spindles being preferably supported in a ball bearing 47 permanently situated beneath the table 12. When drilling is performed, successive bores can be made of the same depth by adjustment of the collar 27 on the shaft 25.

The chuck 29, having had any bit therein removed, and the shaft 24' secured in raised position by the collar 28 and set-screw, and the shaft 14 raised and secured by a set-screw, and rotation of the shaft 24' being stopped by disengaging the wheel 20 and 21, ample room is provided above the table for effecting other operations, such as sawing. To use a jig-saw it is attached to the clips 102 and is drawn downwardly by the shaft 15 and upwardly by the spring 98 on the shaft 17. Having removed the jig-saw, a band-saw can be used by removing the belt 75 and placing the band-saw over the pulleys 8, 9, 11 and passing it through the greasing device; the tension of the saw being regulated by the tensioning device operating in connection with the shaft 70 and wheel 9.

Various devices for holding the material to be worked are attachable to the table 12. In Figs. 4, 5 and 6 a device is shown for holding wood, at any desired angle, to be mortised. The device comprises a plate 32 capable of being secured at any height above the table 12 by a screw 31 and locking nuts 114. A guide 33 secured to the plate 32, enables a plate having the shape of one half, 115, of a disc to slide adjacent a similarly shaped piece 117 which is secured by screws to the plate 32. The part 115 can be secured in any desired position by set-screws 118 (Figs. 5 and 6) in lugs 119. A plate 30 is capable of being turned about a pivot 121 in the part 115 and, to attain stability, has secured to its underside a socket 122 in which is an adjustable screw 123 having a head 124 constituting a support which can be raised or lowered consistently with the height at which the plate 30 is adjusted by the screw 31. Besides adjustment in height, the plate 30 can be moved in a circular direction about the pivot 121; there being a further guide 37 therefor consisting of a nut 125, having a lug entering a groove 126 in the plate 115. The nut 125 is held to the plate 30 by a countersunk screw 127 whereby it can be drawn tightly against the upper part of the groove 126 to bind the plate 115 to the underside of the plate 30 when this plate is at any desired position. The plate 30 can also be moved horizontally in various ways by movement of the plate 115 between its guide 33 and its component half 117 of a disc, and turning the plate 32 into different positions by loosening the nuts 114; the broken lines in Fig. 6, showing some of the positions to which these parts can be adjusted.

Clamping bars 38, 39 have grooved end-pieces 128 which are slidable on the edges 129 of the plate 30 and are rendered adjustable by set-screws 40 secured in brackets 130 secured on the plate 30. Each end piece 128 has pivoted therein a roller 41 between which rollers wood to be mortised or otherwise worked upon is clamped by the screws 40; one of the rollers being combined with a handle 42 and having teeth 131. Turning the handle will cause the teeth to impinge upon and move the wood between the rollers. By means, therefore, of all the adjustments mentioned the wood can be moved so that a bit in the chuck 29 will cut mortises at any angle as shown, for instance, at 138, Fig. 6.

In Figs. 8 and 9, a device 52 is shown for holding wood to be planed. The device comprises a plate 133 which is rendered adjustable, in a horizontal direction, by slots 134 through which screws 135 pass into suitable screw-threaded perforations 136 in the table 12. A block 137 is secured to the plate 133, by screws or other means, and is surmounted by a plate 140, having a curved edge 141 and a boss 142, recessed into the block 137 and pivotally secured thereto by a screw 143; there being a screw 144 in the block 137 having a head which overlaps the curved edge 141. The plate 140 has two edges 138, 139 at right angles to each other and, to one of the edges is secured a bar 53 having bolts 145 by which a wooden backing and guide for wood to be planed can be readily attached and removed therefrom for substitution by others which may have surfaces at different angles to plane, for instance weather-boards. A metal guide-bar 51' rests in the groove 145 in the plate 12 and can be adjusted towards or away from the cutter blades 49, 50 to limit the depth of their cut; the blades projecting through an opening in the plate. The adjustment is effected by screws 147 in the edges of the table 12 and projecting through slots 148 in lugs 149. By loosening the screw 144 the plate 140 can be turned about its pivot to adjust the guide 54 to different angles to the cutter or to a position at right angles to the position shown in full lines in Fig. 9, and, further, the plate 133 can be secured in different positions upon the table 12, as shown by broken lines.

What I claim is:—

1. A wood-working machine comprising, in combination, a foot or power-propelled speed gear having a driven pulley thereon, a second pulley combined with a tensioning device, a third pulley, said pulleys having rubber bands thereon, and jockey-pulleys whereby a driving belt travelling over said pulleys is kept clear of the work-supporting table and over which pulleys, excepting the jockey-pulleys, a band-saw can run; there being a saw greasing device situated adjacent the saw.

2. A wood-working machine comprising, in combination, a foot or power-propelled speed gear having a driven pulley thereon, a second pulley combined with a tensioning device, a third pulley, said pulleys having rubber bands thereon, and jockey-pulleys whereby a driving belt travelling over said pulleys is kept clear of the work-supporting table and over which pulleys, excepting the jockey-pulleys, a band-saw can run; there being a saw greasing device situated adjacent the saw, the aforesaid speed-gear, comprising a shaft capable of reciprocatory motion, a shaft capable of reciprocation in the machine frame and situated in alignment with the aforesaid shaft and normally held in raised position by a spring, said shafts having means for attachment thereto of a jig-saw.

3. A wood-working machine comprising, in combination, a foot or power-propelled speed gear having a driven pulley thereon, a second pulley combined with a tensioning device, a third pulley, said pulleys having rubber bands thereon, and jockey-pulleys whereby a driving belt travelling over said pulleys is kept clear of the work-supporting table and over which pulleys, excepting the jockey-pulleys, a band-saw can run; there being a saw greasing device situated adjacent the saw, the aforesaid speed-gear comprising a shaft capable of reciprocatory motion, a shaft capable of reciprocation in the machine frame and situated in alignment with the aforesaid shaft and normally held in raised position by a spring, said shafts having means for attachment thereto of a jig-saw, a pair of bevel-pinions supported in the machine frame in such a manner that one of them is capable of being manipulatively put into and out of gear with a bevel wheel, driven by a shaft carrying one of the belt driven pulleys, whilst the other bevel-pinion meshes with a similar bevel-pinion on and adapted to impart rotation to a shaft on which is a tool holding chuck, said shaft being capable of manipulative adjustment longitudinally in its bearings and provided with collars and set screws constituting means respectively for limiting the movement of the shaft on its bearing and retaining it in desired position with respect thereto.

4. A wood-working machine comprising, in combination, a foot or power propelled speed gear having a driven pulley thereon, a second pulley combined with a tensioning device, a third pulley, said pulleys having rubber bands thereon, and jockey-pulleys whereby a driving belt travelling over said pulleys is kept clear of the work-supporting table and over which pulleys, excepting the jockey-pulleys, a band-saw can run; there being a saw greasing device situated adjacent the saw, the aforesaid speed-gear comprising a shaft capable of reciprocatory motion, a shaft capable of reciprocation in the machine frame and situated in alignment with the aforesaid shaft and normally held in raised position by a spring, said shafts having means for attachment thereto of a jig-saw, a pair of bevel-pinions supported in the machine frame in such a manner that one of them is capable of being manipulatively put into and out of gear with a bevel wheel, driven by a shaft carrying one of the belt driven pulleys, whilst the other bevel-pinion meshes with a similar bevel-pinion on and adapted to impart rotation to a shaft on which is a tool holding chuck, said shaft being capable of manipulative adjustment longitudinally in its bearings and provided with collars and set screws constituting means respectively for limiting the movement of the shaft in its bearing and retaining it in desired position with respect thereto, and the work-table having a ball or other bearing adapted to receive one end of a bit shank of which the other end is held by the chuck.

5. A wood-working machine comprising, in combination, a foot-propelled speed gear, a pulley thereon, a pulley combined with a saw tensioning device, a third pulley, jockey pulleys, a saw greasing device, a jig-saw holding shaft capable of reciprocation by the speed gear, a jig-saw holding shaft capable of reciprocation in the machine and in alignment with the aforesaid jig-saw holding shaft and normally held in upward position by a spring, a shaft carrying a tool-holding chuck, bevel-pinions of which one is capable of being put into and out of gear with an adjacently situated tooth-wheel to impart motion to or stop motion of said shaft carrying the tool-holding chuck, means for adjusting the position of said shaft longitudinally, a ball bearing on a work-supporting table to retain in position one end of bits in the aforesaid chuck, a screw adjustable in a screw-threaded opening in said table, an auxiliary and adjustable wood holding table having adjustable wood-clamping means thereon, and the aforesaid work supporting table having a slot, a wood guiding bar movable and adjustable in said slot and a second wood guiding bar attached to a fitting adjustable on screws entering screw-threaded perforations in said work-supporting table.

In testimony whereof I have signed my name to this specification.

HONORÉ ROZIER.